United States Patent
Shin

(10) Patent No.: US 7,082,266 B1
(45) Date of Patent: Jul. 25, 2006

(54) OPTICAL FILTER AND APPARATUS AND METHOD FOR MONITORING OPTICAL CHANNEL USING THE OPTICAL FILTER

(75) Inventor: Keun-Ho Shin, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 09/484,057

(22) Filed: Jan. 18, 2000

(30) Foreign Application Priority Data

Jan. 18, 1999 (KR) ................................ 1999-1260

(51) Int. Cl.
*H04J 14/02* (2006.01)

(52) U.S. Cl. .......................... 398/79; 398/14; 398/34; 398/9; 385/39

(58) Field of Classification Search ................ 359/127, 359/110; 385/39; 398/79, 9, 14, 34; 356/302–305, 356/319–320, 323–325, 328
See application file for complete search history.

(56) References Cited

U.S. PATENT DOCUMENTS

| | | | | |
|---|---|---|---|---|
| 5,347,525 | A | * | 9/1994 | Faris .......................... 359/116 |
| 5,481,183 | A | | 1/1996 | Johnson et al. ........... 372/76.36 |
| 5,808,763 | A | * | 9/1998 | Duck et al. ................. 359/127 |
| 5,825,792 | A | | 10/1998 | Villeneuve et al. ........... 372/32 |
| 6,011,623 | A | * | 1/2000 | MacDonald et al. ........ 356/519 |
| 6,344,914 | B1 | * | 2/2002 | Shimojoh et al. ........... 359/161 |

OTHER PUBLICATIONS

Korean Patent Office Action (Notice to Submit Response), dated Mar. 23, 2001 with English translation.
Pages 156-161 of Electronics Letters, vol. 24, No. 3, dated Feb. 4, 1988.
www.whatis.com (also known as "techtarget") definitions for "modulation" (http://searchnetworking.techtarget.com/sDefinition/0,,sid7_gci212586,00.html), pp. 1-2; and "multiplexing" (http://searchnetworking.techtarget.com/sDefinition/0,,sid7_gci212586,00.html), pp. 1-2.

* cited by examiner

*Primary Examiner*—David C. Payne
(74) *Attorney, Agent, or Firm*—Robert E. Bushnell, Esq.

(57) ABSTRACT

An apparatus and method for analyzing the spectrum of a wavelength division multiplexed (WDM) optical signal, in wavelength division multiplexing (WDM) optical transmission systems, are provided. An optical filter includes an input unit for receiving a wavelength division multiplexed (WDM) optical signal via an optical transmission medium and outputting optical signals that have different incidence angles according to the wavelengths of the optical signals. Also, the optical filter includes a filter for receiving the optical signals from the input unit and separating the WDM optical signal into optical signals having different wavelengths using the difference between resonance lengths according to the different incidence angles. In order to analyze the spectrum of an optical signal, the optical signal is made incident upon etalon at different incidence angles according to the wavelengths of the optical signal, and the resonance length between two mirrors of etalon is varied according to the wavelengths of the optical signal. Accordingly, an optical spectrum can be obtained by detecting optical signals having different wavelengths.

39 Claims, 1 Drawing Sheet

OPTICAL FILTER AND APPARATUS AND METHOD FOR MONITORING OPTICAL CHANNEL USING THE OPTICAL FILTER

CLAIM OF PRIORITY

This application makes reference to, incorporates the same herein, and claims all benefits accruing under 35 U.S.C. § 119 from an application entitled Optical Filter And Apparatus And Method For Monitoring Optical Channel Using The Optical Fiber earlier filed in the Korean Industrial Property Office on the 18th day of Jan. 1999, and there duly assigned Serial No. 1260/1999 by that Office.

BACKGROUND OF THE INVENTION

1. Field of the Invention

The present invention relates to a wavelength division multiplexing (WDM) optical communications system, and more particularly, to an apparatus and method for analyzing the spectrum of an optical signal using etalon to monitor a change in the wavelength of a wavelength division multiplexed (WDM) optical signal and the optical signal-to-noise ratio (OSNR) of the WDM optical signal.

2. Description of the Related Art

Monitoring of WDM optical signals in optical transmission systems is a key technique in wavelength division multiplexing (WDM). The monitoring of an optical signal of each channel as to whether the optical signals operate normally is required to obtain high reliability in optical transmission systems.

Measuring the OSNR of each channel, a change in the wavelength, and the number of wavelengths, which is essential for channel monitoring techniques, is performed by obtaining amplified spontaneous emission (ASE), and the output and wavelength in each channel.

In the prior art, a method of transmitting a dither signal to each channel, a method of using an arrayed waveguide grating (AWG) or a tunable filter which are optical devices, and other commercialized spectrum analyzer techniques are applied to achieve the above measurement.

Precise measurement of a peak value in a wavelength and the OSNR is essential for wavelength monitoring. However, the method of transmitting a dither signal to each channel and monitoring an optical signal in a receiving terminal using a phase locked loop (PLL) cannot obtain a wavelength value. The method using optical devices such as an AWG, a tunable filter, or the like, which can obtain even wavelength values, is quite costly. An optical spectrum analyzer or a multiple wavelength meter, which are used for optical spectrum analysis, is commercialized but expensive, so it is not suitable for channel monitoring. Therefore, there is an increasing demand for a spectrum analyzer which is simple and can be applied to monitor the channels of a WDM optical signal.

A spectrum analysis technique is the fundamental principle for achieving channel monitoring of a WDM optical signal. In existing spectrum analysis techniques using a Fabry Perot tunable filter, the thickness of etalon is varied by an electrical signal, thus deteriorating the accuracy and requiring a controller for variable control.

U.S. Pat. No. 5,825,792 for a Wavelength Monitoring and Control Assembly for WDM Optical Transmission Systems to Villeneuve et al discloses a Fabry-Perot etalon structure that provides feedback loop back to the laser source to control the laser source. What is needed is the use of such an etalon structure that interacts with the output of a fiber optic multiplexed signal to discern the spectral components and the optical signal to noise ratio of various wavelengths that may be traveling through an optical fiber.

SUMMARY OF THE INVENTION

An objective of the present invention is to provide an optical filter which effectively uses the function of etalon, and an apparatus and method for monitoring optical channels using the optical filter, in monitoring a channel signal of a wavelength division multiplexed (WDM) optical signal.

It is another object to discern the optical components of a WDM signal and discern the optical signal to noise ratio of each component.

To achieve the above objective of the invention, there is provided an optical filter including: an input unit for receiving a wavelength division multiplexed (WDM) optical signal via an optical transmission medium and outputting optical signals that have different incidence angles according to the wavelengths of the optical signals; and a filter for receiving the optical signals from the input unit and separating the WDM optical signal into optical signals having different wavelengths using the difference between resonance lengths according to the different incidence angles.

To achieve the above objective of the invention, there is provided an optical channel monitoring apparatus including: an optical filter for receiving a WDM optical signal from an optical transmission medium, making the incidence angle of each wavelength of the WDM optical signal different from each other, and separating the WDM optical signal into optical signals having different wavelengths using the difference between resonance lengths according to the different incidence angles; and a detector for detecting the intensity of each of the optical signals having different wavelengths as an electrical signal.

To achieve the above objective of the invention, there is provided an optical channel monitoring method including: receiving a WDM optical signal from an optical transmission medium and outputting optical signals that have different incidence angles according to the wavelengths of the optical signals; receiving the optical signals and separating the WDM optical signal into optical signals having different wavelengths using the difference between resonance lengths according to the different incidence angles; and detecting the intensity of each of the optical signals having different wavelengths as an electrical signal.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
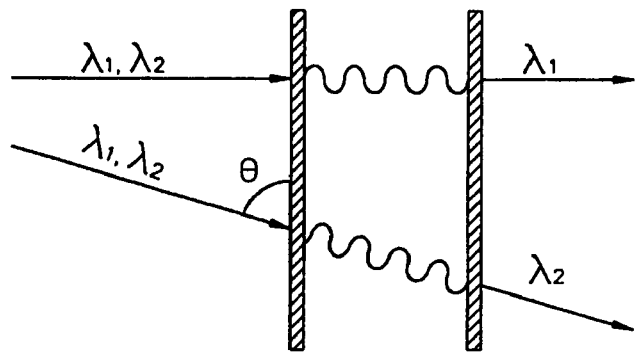
FIG. 1 illustrates the principle of a Fabry-Perot resonator.

Referring to FIG. 1, which illustrates the principle of a Fabry-Perot resonator which is a component of the present invention, an optical signal having a wavelength of λ is resonated in an etalon and transmitted through the etalon. The optical signal satisfies Equation 1:

EQUATION 1

$$\sin(2\pi L/\lambda) = m\pi \quad (1)$$

wherein m is a positive integer, that is, 1, 2, 3, . . . , and L denotes the interval between etalon plates.

In FIG. 1, when optical signals having wavelengths of $\lambda_1$ and $\lambda_2$ are incident upon the etalon via an optical fiber at different angles, they are transmitted at different angles. The present invention is a spectrum analysis technique using this principle. The principle is based on the fact that the resonance length between two mirrors depends on the incidence angle of light. When a wavelength perpendicularly applied and transmitted is set to be $\lambda_1$, a predetermined number of wavelengths exist within a resonance length, so that the relationship shown in Equation 2 is established. When light is incident at an angle of θ, the resonance length is increased by Equation 3, and the transmission wavelength $\lambda_2$ of an optical signal is given by Equation 4.

EQUATION 2

$$\lambda_1 = \frac{L}{n} \quad (2)$$

wherein n denotes the number of wavelengths within a resonator.

EQUATION 3

$$resonance length = \frac{L}{\sin\theta} \quad (3)$$

EQUATION 4

$$\lambda_2 = \frac{L}{n\sin\theta} \quad (4)$$

The angle of detection depending on a wavelength which is used in WDM optical transmission systems, can be obtained using Equation 4, as shown in the following Table 1.

| Wavelength (nm) | θ(°) |
|---|---|
| 1540.55 | 90.0 |
| 1541.35 | 88.2 |
| 1542.14 | 87.4 |
| 1542.93 | 86.8 |
| 1543.73 | 86.3 |
| 1544.52 | 85.9 |
| 1545.32 | 85.5 |
| 1546.16 | 85.1 |
| 1446.91 | 84.8 |
| 1547.71 | 84.5 |
| 1548.51 | 84.2 |
| 1549.31 | 83.9 |
| 1550.11 | 83.6 |
| 1550.91 | 83.4 |
| 1551.72 | 83.1 |
| 1552.52 | 82.9 |
| 1553.33 | 82.6 |
| 1554.13 | 82.4 |
| 1554.94 | 82.2 |
| 1555.74 | 82.0 |
| 1556.55 | 81.8 |
| 1577.36 | 81.6 |
| 1558.17 | 81.4 |
| 1558.98 | 81.2 |
| 1559.80 | 81.0 |
| 1560.60 | 80.8 |
| 1561.42 | 80.6 |
| 1562.23 | 80.4 |
| 1563.04 | 80.3 |
| 1563.86 | 80.1 |
| 1564.68 | 79.9 |
| 1565.50 | 79.8 |

Figure 2:
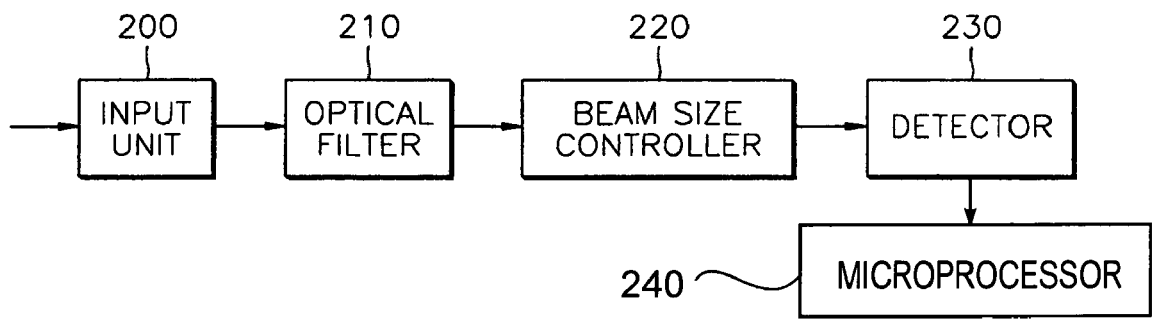
FIG. 2 is a block diagram of an optical channel monitoring apparatus according to an embodiment of the present invention.

Referring to FIG. 2, a channel monitoring apparatus according to an embodiment of the present invention includes an input unit 200, an optical filter 210, a beam size controller 220, and a detector 230. A WDM optical signal is input to the input unit 200. In the input unit 200, a lensed fiber having a small spreading angle is used at the end portion thereof, and the WDM optical signal is controlled to be incident upon the optical filter 210 at different angles according to wavelength through a cylindrical concave lens. The optical filter 210 separates optical signals received from the input unit 200 according to their wavelengths, and output the same to the beam size controller 220. The beam size controller 220 controls the beam size of optical signals which have passed through the optical filter 210. An optical signal adjusted by the amplifier 220 is applied to the detector 230 for converting the optical signal into an electrical signal. The optical signal converted into an electrical signal in the detector 230 is applied to a data processing device such as a microprocessor, and thus the wavelength and the OSNR of the optical signal are calculated.

Figure 3:
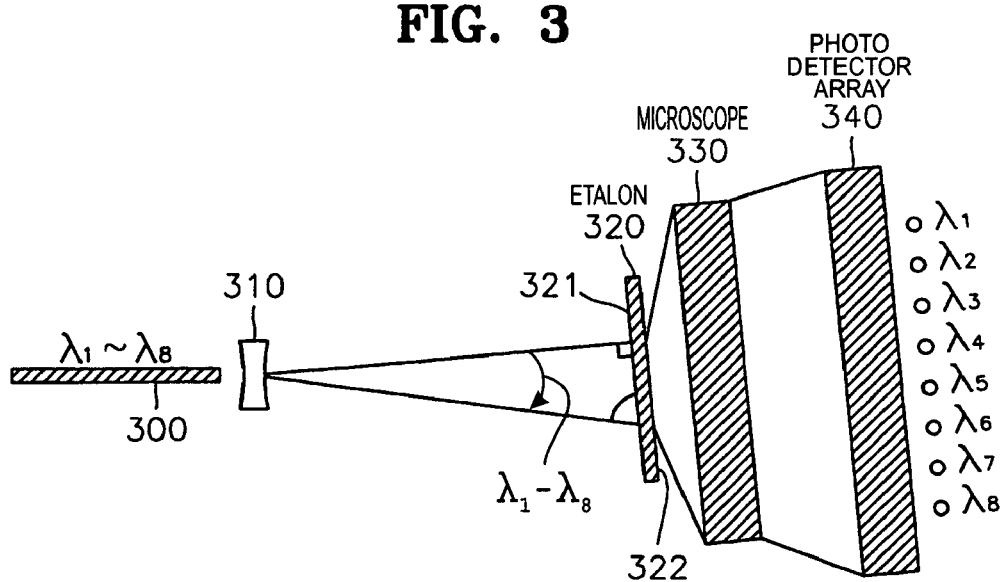
FIG. 3 is a detailed diagram of FIG. 2.

Referring to FIG. 3, which is a detailed diagram of the channel monitoring apparatus shown in FIG. 2, input unit 200 of FIG. 2 corresponds to optical fiber 300 and lens 310 of FIG. 3 and optical filter 210 of FIG. 2 corresponds to etalon 320 of FIG. 3. The lens of the input unit receives WDM light through the optical fiber and outputs a plurality of optical signals each of which has a different wavelength and also has a different incident angle to the optical-filter. Lens 310, for example, a cylindrical concave lens, allows a WDM optical signal received via an optical fiber 300, to be incident upon a first surface 321 of etalon 320 at various angles. Here, the lensed fiber at the end portion of the input unit collimates incident light, and then the cylindrical concave lens controls the angle of the collimated light. Now, the WDM optical signal is assumed to have been multiplexed with optical signal channels having wavelengths of $\lambda_1$ through $\lambda_8$. The optical signals incident upon the first surface 321 at different angles are positioned on a second surface 322 of the etalon 320 according to the wavelengths of the optical signal, that is, wavelengths of $\lambda_1$ through $\lambda_8$, on the basis of the incidence angles of the optical signals. This shows an application of a phenomenon in which a resonance length within the etalon 320 varies with the incidence angle $\theta$ using the principle of a Fabry-Perot resonator. The optical signals separated according to their wavelengths are input to an infrared photo detector (IR PD) array 340. An optical instrument such as a microscope 330 may be used to adjust magnification of light in order for the IR PD to analyze the focused light. The PD array 340 receives the optical signals and converts the same into electrical signals. Data on the optical signals converted into the electrical signals by the PD array 340 is applied to a data processing device such as a microprocessor, and is used to calculate the wavelengths and the OSNR of the optical signals.

The etalon 320 can prevent different wavelengths from being detected at the same angle, only when a free spectral range (FSR) is thin enough to include channels for WDM. The FSR with respect to the number of vibrations is given by Equation 5:

$$FSR_v = \frac{c}{2nL} \quad (5)$$

wherein c denotes a velocity of light, n denotes a refractive index, v denotes the number of vibrations, and L denotes the interval between plates of etalon.

The FSR with respect to wavelength is given by Equation 6:

EQUATION 6

$$FSR_\lambda = \frac{\lambda}{2nL} \quad (6)$$

wherein c denotes a velocity of light, n denotes a refractive index, X denotes a wavelength, and L denotes the interval between plates of etalon.

The fineness representing the characteristics of light transmitted through the etalon 320 is defined by Equation 7, and must be great to increase the resolution between wavelengths.

EQUATION 7

$$\text{fineness} = \frac{FSR_\lambda}{\Delta\lambda} \quad (7)$$

wherein $\Delta\lambda$ denotes the full width half maximum of a wavelength.

Also, the fineness is a function with respect to a reflective index R as shown in Equation 8, so that it can be seen that the fineness increases with an increase in R.

EQUATION 8

$$\text{fineness} = \frac{\pi\sqrt{R}}{1-R} \quad (8)$$

Calculation of the specification of the etalon 320 will be taken as an example. According to the calculation based on Equations 6, 7 and 8, a 0.8 nm 32-channel optical signal, which is used for WDM optical transmission, must have a fineness in which the entire wavelength interval is 24.8 nm or greater. Here, on the assumption that the refractive index n is 1.4 and the FSR is 30 nm, the thickness of the etalon 320 is calculated to be 28.6 μm. Also, the resolution between wavelengths must be smaller than 0.1 nm to be used for channel monitoring in WDM optical transmission systems, so that the fineness associated with the resolution must be increased. Here, when the FSR is set to be 30 nm, the fineness must be greater than or equal to 300 to obtain a resolution of 0.1 nm. Therefore, it becomes evident that the reflective index of etalon, R, must be greater than or equal to 99% to obtain a fineness of 300.

Before incident light is input to the lens 310, a lensed fiber is used to prevent the incident light from spreading. Referring to the calculated angles in Table 1, angles of incidence upon the etalon 320 must be at least 10.5° to detect wavelengths of 32 channels. Thus, the incidence angles of light are controlled by the lens 310 such as a cylindrical concave lens. Since optical signals transmitted at different angles are detected by the PD array 340, the etalon 320 must be sufficiently separated from the lens 310 so that the resolution of an optical signal is greater than or equal to 0.1 nm and a sufficiently large image lands on the etalon 320. When the intensities of optical signals passed through the etalon 320 are weak, the microscope 330 is used.

The intensity of light according to wavelengths is calculated by detecting the intensity of light according to the transmitted positions using the PD array 340. At this time, the intensity of a channel having the highest intensity, and the intensity of ASE are calculated, thereby obtaining the OSNR which is the ratio of the intensity of incident optical signals to the intensity of ASE. The distribution of light detected by the PD array 340 via the etalon 320 is calculated in terms of current. Thus, a microprocessor or the like can obtain the wavelength of each channel and the OSNR thereof on the basis of the current value.

According to the present invention, the resonance length between two mirrors of etalon is varied according to wavelengths by making an optical signal incident upon etalon at different incidence angles according to wavelengths of the optical signal to analyze the spectrum of the optical signal. Accordingly, an optical spectrum can be obtained by detecting optical signals having different wavelengths. Therefore, an electrical device for varying the thickness of etalon is not required in the present invention, and the spectrum of an optical signal can be simply analyzed at low cost.

What is claimed is:

1. An optical channel monitoring apparatus, comprising:
an input unit comprising a lensed fiber receiving a wavelength division multiplexed (WDM) optical signal comprising a plurality of channels occupying a same space via an optical transmission medium and producing a collimated beam of optical signals, said input unit further comprising a concave lens receiving said collimated beam and outputting a plurality of optical signals that have a continuous range of incidence angles; and
a filter for receiving said plurality of optical signals from the input unit and separating the WDM optical signal into a plurality of optical signals having different wavelengths using the difference between resonance lengths according to the incident angles, wherein each of said plurality of optical signals representing a different one of said plurality of channels becomes spatially separated from each other by said filter.

2. The apparatus of claim 1, further comprising an array of detectors receiving optical signals output by said filter and converting said optical signals into electrical signals, each detector being positioned to pick up a specific wavelength of incident radiation emanating from the filter, said apparatus further comprising a microprocessor calculating signal to noise ratio and spectral components of said optical signals output from said filter.

3. The apparatus claim 2, an etalon is used as the filter.

4. An optical channel monitoring apparatus, comprising:
an input part receiving a multiplexed, collimated optical signal and dispersing said collimated optical signal via a concave lens into a beam having different incident angles;
an optical filter receiving the wavelength division multiplexed (WDM) optical signal having different incident angles from the input part and separating the spanned WDM optical signal into a plurality of optical signals having different wavelengths using the difference between resonance lengths according to the different incidence angles; and
a plurality of detectors, each detector being spatially positioned to receive incident radiation of a specific wavelength, said plurality of detectors detecting the intensity of each of said plurality of optical signals having different wavelengths and converting said optical signals to electrical signals, said optical filter being an etalon having a free spectral range of 30 nm.

5. An optical channel monitoring method, comprising the steps of:
receiving a wavelength division multiplexed (WDM) optical signal comprising a plurality of channels spatially occupying a same space from an optical transmission medium and outputting, via a concave lens, a plurality of optical signals spanning a continuous range of incidence angles;
receiving said plurality of optical signals spanning said range of incident angles and spatially separating the plurality of channels that make up the WDM optical signal according to wavelengths using the difference between resonance lengths according to the different incidence angles into a plurality of optical signals, each optical signal representing a single one of said plurality of channels, each channel being spatially separated from other channels of said plurality of channels; and
detecting the intensity of each of said plurality of optical signals having different wavelengths and converting said intensity into a corresponding plurality of electrical signals.

6. The apparatus of claim 3, further comprising a beam size controller between said etalon and said detector to amplify said plurality of optical signals having different wavelengths in order to be detected by said array of detectors.

7. The apparatus of claim 4, said concave lens dispersing an input collimated WDM beam into a beam spanning a range of angles, said range of angles being about 10 degrees.

8. The apparatus of claim 7, further comprising an optical amplifier amplifying each of said plurality of optical signals having different wavelengths output by said filter allowing said plurality of optical signals having different wavelengths to be detected by corresponding ones of said plurality of detectors.

9. The apparatus of claim 4, said optical filter being a Fabry-Perot etalon.

10. The apparatus of claim 8, further comprising a microprocessor that determines the wavelength and the optical signal to noise ratio for each of said plurality of optical signals having different wavelengths from said plurality of electrical signals produced by said plurality of detectors.

11. The method of claim 5, further comprising the step of inputting each of said plurality of electrical signals into a microprocessor.

12. The method of claim 11, further comprising the step of determining spectral components and the optical signal to noise ratio for each wavelength for each channel in said plurality of optical signals having different wavelengths by processing said plurality of electrical signals by said microprocessor.

13. The method of claim 12, further comprising the step of amplifying said plurality of optical signals having different wavelengths immediately after separating said optical signals according to wavelengths and immediately prior to said detecting step.

14. The method of claim 13, a Fabry-Perot etalon is used to separate said WDM signal into said plurality of optical signals having different wavelengths.

15. A method for monitoring and diagnosing spectral components and signal to noise ratios of a WDM optical signals passing through an optical fiber, said method comprising the steps of:
outputting said optical signals out of an end of said optical fiber, said end of said optical fiber being lensed producing collimated optical signals upon being output from said optical fiber;
inputting said collimated optical signals into a cylindrical concave lens producing a continuous span of output angles of propagation of said optical signals;
inputting said span of optical signals into a Fabry Perot etalon resonator to separate said optical signals by wavelengths based on incident angles input into said etalon;
inputting said optical signals separated by wavelengths onto an array of detectors producing electrical signals corresponding to wavelengths of said optical signals output from said etalon; and
inputting said electrical signals into a microprocessor to calculate spectral components of said optical signal and signal to noise ratio of said optical signal, said method being able to analyze spectral components of said optical signal with a resolution of 0.1 nm.

16. The method of claim 15, said continuous span of angles being 10 degrees corresponding to a 25 nm range of wavelengths being diagnosed and monitored.

17. The method of claim 16, said etalon having a thickness of 28 microns and the FSR of the etalon being 30 nm.

18. The method of claim 15, further comprising the step of amplifying said optical signals separated by wavelengths emerging from said etalon prior to inputting said optical signals onto said array of detectors.

19. The apparatus of claim 9, said etalon being 28 microns thick, said etalon having a FSR of 30 nm, said apparatus having a resolution of 0.1 nm.

20. The apparatus of claim 3, said etalon being 28 microns thick, said etalon having a FSR of 30 nm, said apparatus having a resolution of 0.1 nm.

21. The apparatus of claim 1, said filter being an etalon having a thickness of 28 microns.

22. The apparatus of claim 1, said filter being an etalon having a free spectral range of 30 nm.

23. The apparatus of claim 1, said filter being an etalon wherein said continuous range of incident angles is greater than 10 degrees.

24. The apparatus of claim 4, said optical filter being an etalon having a thickness of 28 microns.

25. The apparatus of claim 4, said filter being an etalon wherein said incident angles spanning a range greater than 10 degrees.

26. An optical channel monitoring apparatus monitoring the spectral components and the signal to noise ratio of data channels in a wavelength division multiplexed (WDM) optical signal in an optical fiber, said apparatus comprising:
- a concave lens receiving a collimated WDM optical signal from an optical fiber and emitting a beam spanning a range of angles, said range of angles being at least 10 degrees;
- a 30 micron thick etalon receiving said spanned beam and outputting light where the wavelength of said outputted light is dependent on the angle of incidence of light on the etalon, said light output from said etalon having a range of 30 nm in wavelength; and
- an array of detectors receiving said light output from said etalon, each detector being positioned to receive light of a specific wavelength in said 30 nm range of wavelengths, said detectors converting said received light into electrical signals.

27. The apparatus of claim 26, said etalon having a resolution of about 0.1 nm.

28. The apparatus of claim 26, said etalon having a finesse of about 300.

29. The apparatus of claim 26, said etalon having a free spectral range of about 30 nm.

30. The apparatus of claim 26, said apparatus further comprising a microprocessor receiving said electrical signals from said array of detectors, said microprocessor being programmed and configured to calculate the intensity of each spectral component and the signal to noise ratio of each spectral component of said WDM optical signal.

31. The apparatus of claim 1, said filter spatially separating said plurality of different channels of different frequencies in said WDM optical signal from each other.

32. The apparatus of claim 2, said array of detectors receiving optical signals from more than one channel in said WDM signal.

33. The apparatus of claim 1, said WDM optical signal not being demultiplexed prior to impinging on said filter.

34. The apparatus of claim 4, said input part being absent a demultiplexer.

35. The apparatus of claim 4, said plurality of detectors receiving light from a plurality of channels in said WDM signal.

36. The method of claim 15, said method being absent a demultiplexing step outside of said inputting said optical signals into said Fabry Perot etalon step.

37. The apparatus of claim 26, said WDM signal is not demultiplexed prior to impinging on said etalon.

38. The apparatus of claim 26, said array of detectors receiving optical signals that span a range of more than 10 nm.

39. The apparatus of claim 2, said array of detectors receiving optical signals that span a range of more than 10 nm.

* * * * *